(12) United States Patent
Figoureux et al.

(10) Patent No.: US 8,915,466 B2
(45) Date of Patent: Dec. 23, 2014

(54) AIRCRAFT PROVIDED WITH HOIST MEANS, AND AN ASSOCIATED METHOD

(75) Inventors: David Figoureux, Salon de Provence (FR); David Ayache, Le Puy Sainte Reparade (FR); Christophe Gaillard, La Roque D'Antheron (FR)

(73) Assignee: Airbus Helicopters, Marignane Cedex (FR)

(*) Notice: Subject to any disclaimer, the term of this patent is extended or adjusted under 35 U.S.C. 154(b) by 30 days.

(21) Appl. No.: 13/274,577

(22) Filed: Oct. 17, 2011

(65) Prior Publication Data

US 2012/0104152 A1     May 3, 2012

(30) Foreign Application Priority Data

Oct. 27, 2010 (FR) .................................. 10 04224

(51) Int. Cl.
| | | |
|---|---|---|
| *B64C 27/00* | (2006.01) | |
| *B64D 1/22* | (2006.01) | |
| *B66C 23/18* | (2006.01) | |
| *B64C 27/04* | (2006.01) | |

(52) U.S. Cl.
CPC . *B64D 1/22* (2013.01); *B66C 23/18* (2013.01); *B64C 27/04* (2013.01)
USPC ...................... 244/17.11; 244/137.1; 244/136; 244/137.4

(58) Field of Classification Search
USPC ............................ 244/17.11, 137.1, 136, 137.4
See application file for complete search history.

(56) References Cited

U.S. PATENT DOCUMENTS

| | | | | |
|---|---|---|---|---|
| 3,088,608 | A | | 5/1963 | Theodore |
| 3,227,401 | A | * | 1/1966 | Currier ...................... 244/137.4 |
| 3,478,904 | A | * | 11/1969 | Courter ...................... 244/137.1 |
| 3,554,468 | A | * | 1/1971 | McVicar .................... 244/137.4 |
| 4,013,270 | A | | 3/1977 | Laky |
| 4,124,181 | A | * | 11/1978 | Kolwey ...................... 244/137.1 |
| 4,244,561 | A | * | 1/1981 | Campbell et al. ............. 254/288 |

(Continued)

FOREIGN PATENT DOCUMENTS

| | | | | |
|---|---|---|---|---|
| DE | 3323513 | A1 * | 1/1985 | ............... B64D 9/00 |
| DE | 19709380 | A1 | 9/1997 | |

(Continued)

OTHER PUBLICATIONS

Search Report and Written Opinion; Application No. FR 1004224; dated Jun. 15, 2011.

*Primary Examiner* — Timothy D Collins
*Assistant Examiner* — Assres H Woldemaryam
(74) *Attorney, Agent, or Firm* — Brooks Kushman P.C.

(57) ABSTRACT

An aircraft (1) having an airframe (2) extending along an anteroposterior plane of symmetry (P1) in elevation transversely separating a first side (11) of said aircraft (1) from a second side (12) thereof, said aircraft (1) being provided with hoist means (20) including a winch (21) provided with a drum for winding a hoist cable (22), said hoist means (20) including a beam (30) for guiding said cable, said beam (30) extending from a first end (31) constituting an inlet end for said cable (22) to a second end (32) constituting an outlet end for said cable (22). The hoist means (20) have a counterweight (23), said counterweight including said winch (21) that is fastened to said first end (31), said second end (32) being located on said second side (12) while said winch (21) and said first end (31) are located on said first side (11).

12 Claims, 1 Drawing Sheet

(56) References Cited

U.S. PATENT DOCUMENTS

| | | | |
|---|---|---|---|
| 4,267,987 A * | 5/1981 | McDonnell | 244/2 |
| 4,598,882 A * | 7/1986 | Opdahl | 244/1 TD |
| 4,750,691 A * | 6/1988 | Hollrock et al. | 244/137.1 |
| 4,867,321 A | 9/1989 | Montgon | |
| 4,890,751 A * | 1/1990 | Opdahl | 212/271 |
| 5,020,742 A * | 6/1991 | Haslim | 244/137.2 |
| 5,190,250 A * | 3/1993 | DeLong et al. | 244/137.1 |
| 5,209,435 A * | 5/1993 | Edwards | 244/137.2 |
| 5,316,265 A * | 5/1994 | Welch et al. | 254/362 |
| 5,762,297 A * | 6/1998 | Ascherin et al. | 244/137.1 |
| 6,334,590 B1 * | 1/2002 | Landry | 244/137.1 |
| 6,488,236 B2 * | 12/2002 | Landry | 244/137.1 |
| 6,708,926 B2 * | 3/2004 | Bonisch | 244/137.1 |
| 7,681,747 B2 * | 3/2010 | Crowder | 212/179 |
| 8,292,229 B2 * | 10/2012 | Pancotti et al. | 244/129.5 |
| 2002/0020783 A1 * | 2/2002 | Landry | 244/137.1 |
| 2003/0222177 A1 * | 12/2003 | Bonisch | 244/137.1 |
| 2007/0164162 A1 * | 7/2007 | Olive et al. | 244/136 |
| 2009/0146010 A1 * | 6/2009 | Cohen | 244/137.1 |
| 2010/0096508 A1 * | 4/2010 | Pancotti et al. | 244/7 R |
| 2010/0140412 A1 * | 6/2010 | Certain | 244/137.4 |

FOREIGN PATENT DOCUMENTS

| | | |
|---|---|---|
| EP | 0110786 A1 | 6/1984 |
| GB | 2303837 A | 3/1997 |
| WO | 2005025984 A1 | 3/2005 |

* cited by examiner

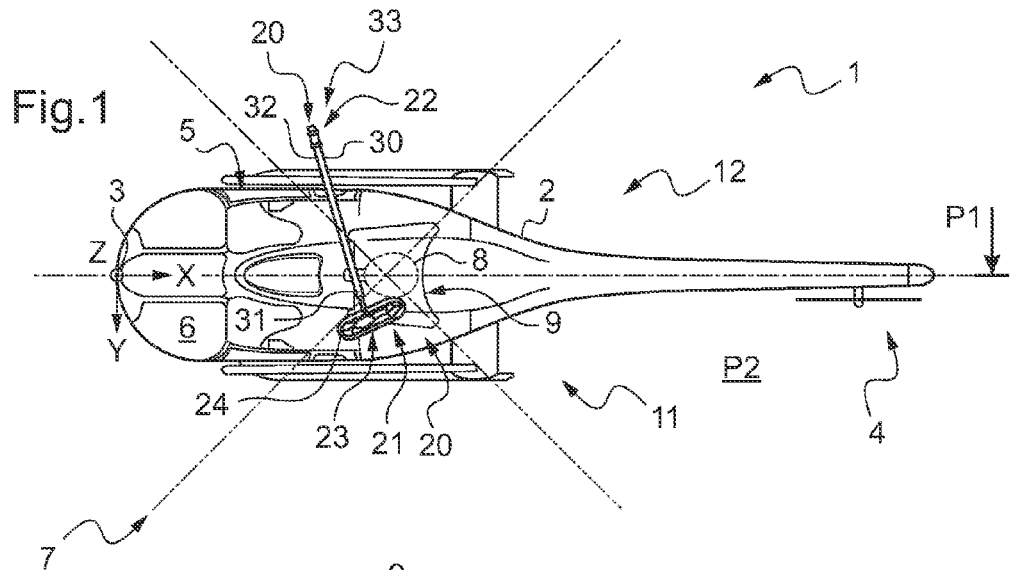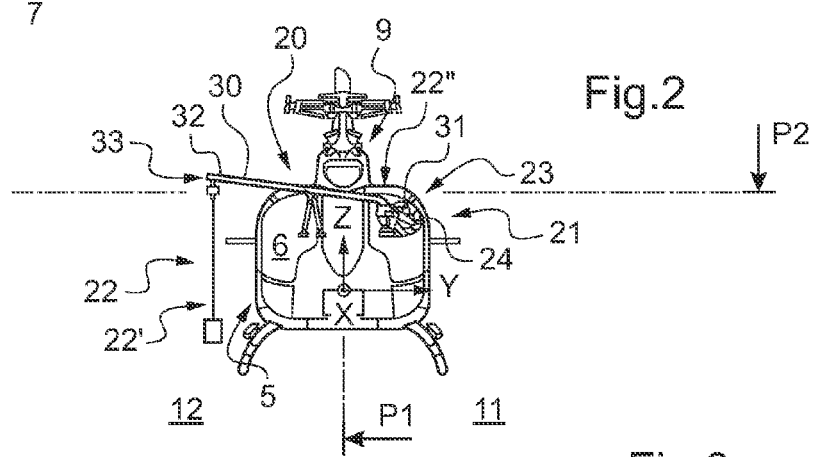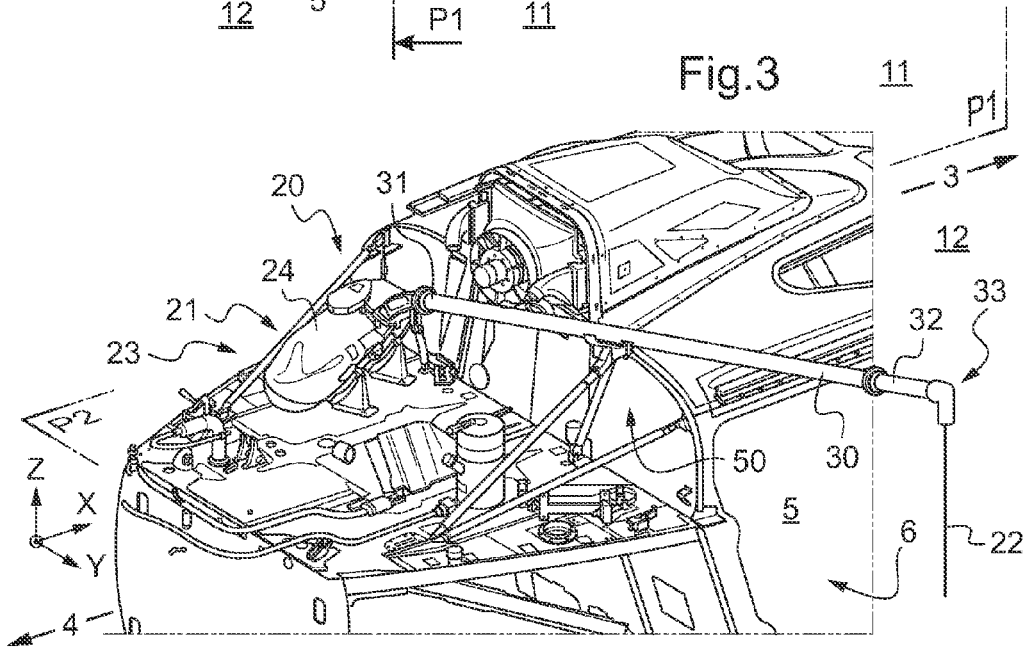

AIRCRAFT PROVIDED WITH HOIST MEANS, AND AN ASSOCIATED METHOD

CROSS REFERENCE TO RELATED APPLICATIONS

This application claims priority to FR 10 04224 filed on Oct. 27, 2010, the disclosure of which is incorporated in its entirety by reference herein.

BACKGROUND OF THE INVENTION (1) Field of the Invention

The present invention relates to an aircraft provided with hoist means, in particular a rotary wing aircraft, and also to the associated method.

Conventionally, hoist means comprise a winch arranged above a cabin of a rotary wing aircraft, for example, such a winch having a rotary drum for winding in and out a cable that serves in particular to lift or transport an external load.

The winch is arranged on a flank of the aircraft, e.g. above a cabin.

That type of installation is nevertheless limiting on light aircraft. When the winch carries a heavy load, e.g. of the order of 150 kilograms (kg), the aircraft tends to tilt with a roll movement towards the side of said load. In addition, there is a particularly large impact on centering the aircraft.

Under such circumstances, a light helicopter provided with a winch on a side flank is capable of carrying only a relatively small load, e.g. less than 150 kg, whereas a heavy helicopter may carry a load of more than 250 kg, for example.

(2) Description of Related Art

The technological background includes the following documents: DE 33 23 513, U.S. Pat. No. 4,750,691, U.S. Pat. No. 5,020,742, DE 197 09 380, U.S. Pat. No. 3,088,608, GB 2 303 837, WO 2005/025984, and U.S. Pat. No. 4,013,270.

Document DE 33 23 513 describes an aircraft provided with a winch carried by one end of a support, the support comprising an extendible beam fastened inside a cabin. The winch is situated vertically above the load that is to be carried, and thus on the same side as the load relative to an anteroposterior plane of symmetry of the aircraft.

Document U.S. Pat. No. 4,750,691 describes hoist means including a retractable beam that is hinged on a flank of an aircraft. In addition, that hoist means is provided with a winch arranged on a faired zone of said flank, vertically in register with the fastening of the beam to the flank.

A cable from said winch then extends along said beam and leaves the aircraft via an outlet end for connection to attachment means.

When the beam is deployed out from the cabin, the cable enables external loads to be supported. The winch is then situated substantially vertically above the load to be carried, and on the same side of the anteroposterior plane of symmetry of the aircraft as said load.

Document U.S. Pat. No. 5,020,742 describes hoist means comprising a winch disposed on a flank of a helicopter and a beam for guiding the cable from said winch and serving to offset a hook of the cable away from the downwash of the lift rotor of the aircraft.

The winch and the load for carrying are both situated on the same side of the anteroposterior plane of symmetry of the aircraft.

Document DE 197 09 380 does not form part of the technical field of the invention since it relates to a building.

Document U.S. Pat. No. 3,088,608 provides for a pivoting beam, which beam is controlled by a motor situated vertically above the load carried by said beam, and thus on the same side of the anteroposterior plane of symmetry of the aircraft as said load.

Document GB 2 303 837 suggests using a winch co-operating with a deflector arm to space the winch cable away from the aircraft. The winch and the load carried by the winch are then both on the same side of the aircraft relative to an anteroposterior plane of symmetry of the aircraft.

Document WO 2005/025984 describes a lifesaving device rather than a hoist device, the lifesaving device having the function of snatching an individual while in flight.

That lifesaving device is fastened to the landing gear of an aircraft.

Document U.S. Pat. No. 4,013,270 describes a beam supporting a winch and a pulley.

SUMMARY OF THE INVENTION

The present invention thus relates to an aircraft of the lightweight rotary-wing aircraft type that is suitable for supporting heavy loads.

According to the invention, an aircraft has an airframe extending from a front end to a rear end along an anteroposterior longitudinal plane of symmetry in elevation transversely separating a first side of the aircraft from a second side thereof, the aircraft being provided with hoist means including a winch provided with a drum for winding a hoist cable, the hoist means including a beam for guiding the cable, the beam extending from a first end constituting an inlet end for the cable to a second end constituting an outlet end for the cable.

The first end is said to be the "inlet" end insofar as the cable coming from the winch enters into the beam via said first end. Conversely, the second end is said to be the "outlet" end insofar as the cable leaves the beam via said second end in order to extend to means for attaching to the external load that is to be carried.

It should be observed that the aircraft may be of any type, even though aircraft having hoist means for external loads are normally rotorcraft of the helicopter type.

In addition, the hoist means include a counterweight, the counterweight including the winch that co-operates with the first end of the beam, the second end being located on the second side while the winch and the first end are located on the aircraft first side.

Under such circumstances, the winch and the load carried by the hoist means are on opposite sides of the anteroposterior plane of symmetry and not both on the same side.

The winch then represents not only means for winding a cable in and out, but also a component part of the counterweight. A counterweight is thus obtained without excessively increasing the overall weight of the hoist means.

Installing the counterweight thus enables the aircraft to carry heavy loads, but without having an influence on its attitude in roll.

It should be observed that this arrangement also improves the aerodynamics of the hoist means, since the winch does not generate unwanted drag on the outside of the aircraft.

The aircraft may include one or more of the following characteristics.

For example, the second end may include a deflector pulley to avoid damaging the cable by abrasion.

In another aspect, the second end may be situated above a side door of the airframe leading to an inside space of the aircraft that is occupied by people, i.e. a cabin or a cockpit of the aircraft.

Under such circumstances, a person may participate in the hoisting operation from said inside space.

It can be understood that the winch is then transversely opposite from the side door.

Furthermore, when the aircraft has a rotary wing set into rotation via a main gearbox, the main gearbox being housed in a gearbox compartment arranged in an upper plane above an inside space of the aircraft that is occupied by people, the winch is advantageously arranged in the gearbox compartment.

Such a compartment for the main gearbox is sometimes referred to as an "MGB compartment" and it constitutes a zone that is particularly full of equipment. In addition to the main gearbox for driving the rotary wing, the gearbox compartment also receives a large amount of pipework, numerous cables of means for fastening the gearbox or controls for acting on the rotary wing in flight. Nevertheless, and surprisingly, it is found that it is still possible to clear space in the gearbox compartment for the counterweight of the hoist means, and in particular its winch.

The beam then passes through a hood of the airframe situated on the second side so as to enable the second end of the beam to be located outside the aircraft.

The gearbox compartment may be arranged longitudinally between an inside space of the aircraft occupied by people and its rear end.

Furthermore, the counterweight may include a fairing secured to the first end, said winch being arranged in the fairing.

This fairing also provides means for protecting the winch against fire.

Depending on the environmental constraints that the winch can withstand, it may be possible to eliminate the winch-specific fairing, since said winch is in a closed zone, out of the reach of personnel while it is in use.

In another aspect, the hoist means include support means for supporting the beam, the support means being arranged on the second side of the aircraft.

In addition to an aircraft, the invention provides a method of optimizing the external load that can be carried by hoist means of an aircraft having an airframe extending from a front end to a rear end along an anteroposterior longitudinal plane of symmetry in elevation transversely separating a first side of said aircraft from a second side thereof, the hoist means including a winch provided with a drum for winding a hoist cable, the hoist means including a beam for guiding the cable, the beam extending from a first end constituting an inlet end for said cable to a second end constituting an outlet end for said cable.

According to this method, a counterweight is arranged on the first side of the aircraft, the counterweight including the winch.

BRIEF DESCRIPTION OF THE DRAWING

The invention and its advantages appear in greater detail from the following description of embodiments given by way of illustration and with reference to the accompanying figures, in which:

FIG. 1 is a plan view of an aircraft of the invention,

FIG. 2 is a face view of an aircraft of the invention, and

FIG. 3 is a truncated isometric view of an aircraft of the invention.

DETAILED DESCRIPTION OF THE PREFERRED EMBODIMENTS

Elements that are shown in more than one of the figures are given the same references in each of them.

Three mutually orthogonal directions X, Y, and Z are shown in the figures.

The direction X is said to be "longitudinal" insofar as the aircraft shown extends longitudinally in that direction.

Another direction Y is said to be "transverse".

Finally, a third direction Z is said to be in "elevation" and it corresponds to the height dimensions of the described structures. The term "thickness" is then relative to an elevation dimension of the device in this elevation direction.

FIGS. 1 to 3 show an aircraft 1 of the invention.

The aircraft 1 comprises an airframe 2 extending longitudinally in an anteroposterior plane of symmetry P1 from a front end 3 to a rear end 4.

Under such circumstances, the anteroposterior plane P1 defines the aircraft transversely, said anteroposterior plane P1 separating a first side 11 of the aircraft 1 from a second side 12.

In conventional manner, in the example shown, the first side is said to be the "port" side of the aircraft 1 and the second side is said to be the "starboard" side. The opposite configuration would be equally applicable, where necessary.

The aircraft 1 shown is a rotorcraft having a rotary wing 7 driven in rotation by a main gearbox 8 that is arranged in a gearbox compartment 9. The rear end 4 is also provided with an antitorque rotor.

The gearbox compartment 9 is then contained in a top plane P2 located in the elevation direction above an inside face 6 of the aircraft that is occupied by people, i.e. the aircraft cabin 1. Furthermore, the gearbox compartment 9 lies between said inside space 6 and the rear end 4 in the longitudinal direction X.

With reference to FIG. 2, the aircraft 1 also includes hoist means 20 comprising a winch 21 co-operating with a hoist cable 22, a first distal zone 22' of the cable 22 being wound on and off a drum (not shown) of the winch 21. The winch 21 is provided with a motor suitable for turning the drum in order to wind the cable 20 in or out depending on the order given by an operator, the operator being present in said inside space 6.

In addition, a second distal zone 22" of the cable 22 includes means for attaching to an external load, e.g. a harness for supporting a person.

The cable 22 is guided outside the aircraft 1 by means of a guide beam 30. Such a beam is sometimes also referred to as a "potence" in French language.

The beam 30 extends from an inlet first end 31 to an outlet second end 32. The cable coming from said winch 21 thus penetrates into the beam via its inlet first end 31 and leaves the beam 30 via its outlet second end 32 in order to reach the external load.

The beam 30 may be a rail or indeed a hollow longitudinal tube, for example.

The second end 32 is optionally provided with a deflector pulley 33 in order to facilitate the change of direction of the cable 22 from a transverse direction towards an elevation direction.

In order to enable the operator to handle the cable, the second end 32 is situated above a side door 5 of the airframe 2, the side door serving to close the inside face 6.

In order to enable a lightweight rotorcraft to carry a load that is relatively heavy, e.g. in order to enable a rotorcraft weighing about 2.5 metric tonnes (t) to 3 metric tonnes to carry a load of 300 kg, unlike the above-mentioned 150 kg, the hoist means include a counterweight 23 arranged transversely opposite from the second end 32 of the beam 30.

The counterweight 23 comprises the winch 21.

Under such circumstances, the winch 21 co-operates with the first end 31 of the beam, possibly being directly or indirectly fastened thereto via some other member of the counterweight 23.

Thus, the winch 21 is transversely opposite from the side door 5. The winch 21 and the first end 31 of the beam are thus on the first side 11 of the aircraft 1, while conversely the side door 5 and the second end 32 of the beam 30 are situated on the second side of the aircraft 1.

The winch 21 thus does indeed constitute a counterweight for the supported external load, thereby limiting or even eliminating any effect of said external load on roll movement of the aircraft.

The counterweight 23 may also include a fairing 24 secured to the first end 31, with the winch 21 being fastened inside the fairing 24. Consequently, the winch 21 is then fastened indirectly to the first end 31 of the beam 30.

With reference to FIG. 3, in a preferred variant, the counterweight is arranged in the gearbox compartment 9. Under such circumstances, the winch 21, the fairing 24, and the first end 31 are located in the gearbox compartment 9 on the first side 11 of the aircraft.

The beam 30 then passes through the hood of the airframe 2 to reach the outside.

In addition, the hoist means shown include support means 50 for supporting the beam 30, the support means being arranged in the gearbox compartment 9, on the second side 12 of the aircraft 1.

It should also be observed that in an aircraft having a winch mounted on a beam, the maximum elevation of the hook carried by the cord of the hoist means relative to the floor of the aircraft is limited by minimum clearance between the winch fitted with its fairing and the disk of the rotor.

According to the present invention, only one deflector pulley is present at the end of the beam, i.e. at the second end of the beam 30. The hook may thus be mounted a little higher relative to the floor, while conserving the same clearance relative to the rotor disk. This additional height serves to facilitate the work of the hoist operator when bringing the load into the airframe 2.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft comprising:
an airframe extending from a front end to a rear end along an anteroposterior longitudinal plane of symmetry in elevation transversely separating a first side of the aircraft from a second side of the aircraft;
a hoist secured to the airframe for lifting a load, the hoist including:
a winch provided with a drum for winding a hoist cable;
a fixed beam for guiding the cable, the fixed beam being stationary with respect to the airframe and extending from a first end constituting an inlet end for the cable and fixed on the first side of the airframe to a second end constituting an outlet end for the cable and fixed on the second side of the airframe; and
a fairing fastened directly to the beam along the first end of the beam, wherein the winch is positioned within the fairing, wherein the fairing and winch act as a counterweight along the first end of the beam and fixed on the first side of the airframe, such that the counterweight counteracts the load being lifted by the hoist cable adjacent the second end of the beam fixed on the second side of the airframe,
wherein the aircraft has a rotary wing set into rotation via a main gearbox, the main gearbox being housed in a gearbox compartment arranged in an upper plane above a cabin of the aircraft, the winch being arranged in the gearbox compartment.

2. The aircraft according to claim 1, wherein the second end of the beam includes a deflector pulley.

3. The aircraft according to claim 1, wherein the second end of the beam is situated above a side door of the airframe leading to a cabin of the aircraft.

4. The aircraft according to claim 1, wherein the gearbox compartment is arranged longitudinally between the rear end of the airframe and the cabin of the aircraft.

5. The aircraft according to claim 1, wherein the hoist includes a support for supporting the beam, the support being arranged on the second side of the airframe.

6. A method of optimizing the external load that can be carried by a hoist of an aircraft having an airframe extending from a front end to a rear end along an anteroposterior plane of symmetry in elevation transversely separating a first side of the aircraft from a second side of the aircraft, the method comprising the steps of:
providing a winch associated with the hoist;
locating a drum in the winch for winding a hoist cable;
guiding a cable around the drum with a fixed beam that extends from a first end constituting an inlet end for the cable to a second end constituting an outlet end for the cable;
arranging the winch including the drum on the first side of the aircraft to act as a counterweight such that the winch and drum are mounted to the fixed beam on the first side of the aircraft and the fixed beam and cable exit the aircraft on the second side of the aircraft, wherein the beam is fixed at a second end on the second side of the aircraft; and
lifting a load adjacent the second side of the aircraft such that the counterweight counteracts the load and optimizes the load that can be carried by the aircraft.

7. An aircraft comprising:
an airframe extending from a front end to a rear end along an anteroposterior longitudinal plane of symmetry in elevation transversely separating a first side of the aircraft from a second side thereof, the airframe having a gearbox compartment; and
a hoist secured to the airframe for lifting a load, the having at least a portion disposed within the gearbox compartment, the hoist comprising:
a winch disposed within the gearbox compartment on the first side of the aircraft, the winch having a drum for winding a hoist cable; and
a fixed beam for guiding the cable such that the beam is fixed to the aircraft and does not move, a first end of the beam fixed to the first side of the aircraft and comprising an inlet end for the cable, and a second end of the beam extending outside the airframe in a fixed position adjacent the second side of the aircraft and comprising an outlet end for the cable,
wherein the winch including the drum define a counterweight and are fastened to the first end of the beam on the first side of the aircraft, and wherein the load is secured to the outlet end of the cable for lifting the load along the second side of the aircraft, wherein the aircraft has a rotary wing set into rotation via a main gearbox, the main gearbox being housed in the gearbox compartment arranged in an upper plane above a cabin of the aircraft.

8. The aircraft according to claim 7, includes a deflector pulley secured to the second end of the beam.

9. The aircraft according to claim 7, wherein the second end of the beam is situated above a side door of the airframe leading to a cabin of the aircraft.

10. The aircraft according to claim 7, wherein the gearbox compartment is arranged longitudinally between the rear end and the cabin of the aircraft.

11. The aircraft according to claim 7, wherein the counterweight includes a fairing fastened directly to the first end of the beam, with the winch being arranged in the fairing.

12. The aircraft according to claim 7, wherein the hoist includes a support member for supporting the beam, the support member being arranged on the second side of the aircraft.

* * * * *